(12) United States Patent
Hanaoka (10) Patent No.: US 8,646,269 B2
(45) Date of Patent: *Feb. 11, 2014

(54) CYLINDER APPARATUS (71) Applicant: Nissin Kogyo Co., Ltd., Nagano (JP)

(72) Inventor: Mitsuhiro Hanaoka, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,149

(22) Filed: Dec. 6, 2012

(65) Prior Publication Data

US 2013/0092022 A1 Apr. 18, 2013

Related U.S. Application Data (63) Continuation of application No. 12/561,699, filed on Sep. 17, 2009, now Pat. No. 8,347,623.

(30) Foreign Application Priority Data

Sep. 19, 2008 (JP) .................................. 2008-240535

(51) Int. Cl.
*F15B 7/08* (2006.01)

(52) U.S. Cl.
USPC .......................................................... 60/588

(58) Field of Classification Search
USPC ............ 60/588; 277/551, 552, 553, 554, 555, 277/556, 557, 558
See application file for complete search history.

(56) References Cited

U.S. PATENT DOCUMENTS

| 7,963,113 B2 * | 6/2011 | Hanaoka et al. ................. 60/588 |
| 8,347,623 B2 * | 1/2013 | Hanaoka ......................... 60/588 |
| 8,434,304 B2 * | 5/2013 | Hanaoka ......................... 60/588 |
| 2005/0016174 A1 | 1/2005 | Tsubouchi et al. |

FOREIGN PATENT DOCUMENTS

| EP | 0000516 A1 | 7/1979 |
| EP | 1889767 A1 | 2/2008 |
| GB | 2172064 A | 9/1986 |
| GB | 2183747 A | 6/1987 |
| JP | 54081453 A | 6/1979 |
| JP | 11101349 A | 4/1999 |
| JP | 2003194100 A | 9/2003 |
| JP | 2004231093 A | 8/2004 |
| JP | 2007502737 | 2/2007 |

OTHER PUBLICATIONS

Japanese Office Action for corresponding Japanese Application No. 2008-240535, drafting date Jul. 13, 2010.
English translation of Japanese Office Action for corresponding Japanese Application No. 2008-240535, drafting date Jul. 13, 2010.
European Search Report for corresponding European Application No. 09170665.5-2423, Jan. 28, 2010.

* cited by examiner

*Primary Examiner* — Michael Leslie
(74) *Attorney, Agent, or Firm* — Andrew M. Calderon; Roberts Mlotkowski Safran & Cole, P.C.

(57) ABSTRACT

A cup seal includes a base portion disposed on a cylinder bore opening portion side of a seal groove, an inner circumferential lip portion extended from an inner circumferential side of the base portion toward a cylinder bore bottom portion and having an inner circumferential surface slidably abutting against an outer circumferential surface of a piston (plunger), and an outer circumferential lip portion extended from an outer circumferential side of the base portion toward the cylinder bore bottom portion and having an outer circumferential surface abutting against a seal groove bottom surface. The cup seal also includes an abutment surface and contact pressure adjustment surface.

12 Claims, 6 Drawing Sheets

CYLINDER APPARATUS

BACKGROUND OF INVENTION

1. Field of the Invention

The present invention relates to a cylinder apparatus and particularly to a cylinder apparatus in which a piston is movably inserted into a cylinder bore via a cup seal.

2. Description of Related Art

In a cylinder apparatus, it is known that an annular seal groove is formed on an inner circumferential surface of a cylinder bore into which a piston is movably inserted, and a cup seal for slidably sealing the portion between the cylinder bore and the piston is fitted into the seal groove.

In general, as described in Japanese Patent Unexamined Publication JP-A-2004-231093, the seal groove includes: a seal groove bottom surface extending in a circumferential direction; a bottom-side-surface on a cylinder bore bottom portion side; an opening-side-surface on a cylinder bore opening portion side; and a seal groove opening opened to a piston. Further, the cup seal includes: a base portion disposed on the cylinder bore opening portion side of the seal groove, an inner circumferential lip portion extended from an inner circumferential side of the base portion toward the cylinder bore bottom portion and having an inner circumferential surface which slides relative to an outer circumferential surface of the piston; and an outer circumferential lip portion extended from an outer circumferential side of the base portion also toward the cylinder bore bottom portion and having an outer circumferential surface which abuts against the seal groove bottom surface.

In addition, for improving sealing property of the cup seal, an annular protruding portion protruding toward the piston side is formed on the inner circumference of the base portion. However, when such an annular protruding portion is formed, there are cases where the annular protruding portion is bitten into a passage hole provided in the piston when the operation of the piston is started. In order to prevent this situation, as described in Japanese Patent Unexamined Publication JP-A-2003-194100, it is proposed to provide a tapered surface on the inner circumference of the base portion which becomes wider toward the outer diameter side.

In the cup seal described in JP-A-2004-231093, in a process where the piston moves forward toward the cylinder bore bottom portion to pressurize a hydraulic fluid in a hydraulic pressure chamber during the operation, the base end surface of the base portion of the cup seal is pressed against an opening-side-surface of the seal groove. At this time, when the contact pressure between the base end surface and the opening-side-surface is increased, the base portion is made less likely to extend in a radial direction of the cylinder, and a sealing force generated by pressing the inner circumferential lip portion positioned on the piston side against the outer circumferential surface of the piston is made less likely to increase. As a result, there is a possibility that an ineffective stroke becomes unstable.

Further, in the cup seal described in JP-A-2003-194100, there is provided a tapered surface which becomes wider toward the outer diameter side and intersects the radial direction of the cylinder bore at an obtuse angle on the inner circumference of the base portion, and the tapered surface is not brought into pressure contact with the piston even when the hydraulic fluid in the hydraulic pressure chamber is pressurized. As a result, the sealing force at the base portion of the cup seal is made less likely to increase similarly to the above-described case, and there is a possibility that the ineffective stroke becomes unstable also similarly to the above-described case.

SUMMARY OF THE INVENTION

Accordingly, an object of the present invention is to provide a cylinder apparatus capable of reliably obtaining sealing force at a base portion of a cup seal and stabilizing the ineffective stroke.

For attaining the above object, according to an aspect of the invention, there is provided a cylinder apparatus including:
a cylinder body including:
a bottomed cylinder bore; and
an annular seal groove provided in the cylinder bore;
a cup seal fitted into the seal groove; and
a piston slidably inserted into the cylinder bore via the cup seal,
wherein the seal groove includes:
a seal groove bottom surface extending in a circumferential direction;
a bottom-side-surface on a cylinder bore bottom portion side;
a opening-side-surface on a cylinder bore opening portion side; and
a seal groove opening opened to a piston side,
the cup seal includes:
a base portion disposed on the cylinder bore opening portion side of the seal groove and having a base end surface opposing to the opening-side-surface of the seal groove;
an inner circumferential lip portion extended from an inner circumferential side of the base portion toward the cylinder bore bottom portion and having an inner circumferential surface slidably abutting against an outer circumferential surface of the piston; and
an outer circumferential lip portion extended from an outer circumferential side of the base portion toward the cylinder bore bottom portion and having an outer circumferential surface abutting against the seal groove bottom surface,
an abutment portion is provided on a base end surface of the base portion of the cup seal,
the abutment portion is protruded from the base end surface of the base portion of the cup seal toward the cylinder bore opening portion so that a protruded end thereof abuts with the opening-side-surface of the seal groove,
a contact pressure adjustment portion is provided on the base end surface of the base portion of the cup seal at a position closer to an inner circumference than the abutment portion,
the contact pressure adjustment portion does not contact with an inner circumferential side of the opening-side-surface in a state where the cylinder apparatus is in a non-operational state; and
the contact pressure adjustment portion contacts with the inner circumferential side of the opening-side-surface in a state where the cylinder apparatus is in an operational state.

According to another aspect of the invention, it is adaptable that:
the abutment portion is provided at a position closer to an outer circumference than an extended base end portion of the inner circumferential lip portion.

Further, it is also adaptable that:
the abutment portion is provided at a position closer to the inner circumference than the extended base end portion of the outer circumferential lip portion.

Furthermore, it is adaptable that:

the contact pressure adjustment portion is a surface in which distance between the surface and the opening-side-surface of the seal groove gradually becomes large toward the inner circumferential side from the abutment portion.

Still further, it is adaptable that:

the contact pressure adjustment portion is a conical surface which intersects a cylindrical surface of the cylinder bore at an acute angle.

Still further, it is adaptable that:

the abutment portion has an abutment surface brought into surface contact with an outer circumferential side of the opening-side-surface.

Still further, it is adaptable that:

the cylinder apparatus is a hydraulic pressure master cylinder for a vehicle.

According to the cylinder apparatus of the present invention, with regard to the inner circumferential side of the opening-side-surface and the inner circumferential side of the base end surface which are in non-contact with each other during non-operation of the cylinder apparatus, since the base portion is deformed in a direction in which the inner circumferential side of the base end surface is brought into pressure contact with the inner circumferential side of the opening-side-surface when the cylinder apparatus is actuated and the hydraulic fluid in the hydraulic pressure chamber starts to be pressurized, the inner circumferential surface of the base portion is smoothly pressed against the outer circumferential surface of the piston.

Consequently, the contact pressure between the inner circumferential surface of the base portion and the outer circumferential surface of the piston is optimized with the pressurization of the hydraulic fluid so that it is possible to stably obtain reliable sealing force and stabilize an ineffective stroke.

In addition, the deformation of the base portion during the rise in the hydraulic pressure becomes smooth by providing the abutment portion at a position closer to the outer circumference than the extended base end portion of the inner circumferential lip portion. Further, by providing the abutment portion at a position closer to the outer circumference, than the extended base end portion of the inner circumferential lip portion and closer to the inner circumference than the extended base end portion of the outer circumferential lip portion, it is possible to optimize the deformation amount of the base portion, obtain the reliable sealing force, and further stabilize the ineffective stroke.

The contact pressure adjustment portion may be easily formed of a surface in which distance between the surface and the opening-side-surface of the seal groove gradually becomes large toward the inner circumferential side from the abutment portion. In particular, by forming the contact pressure adjustment portion with the conical surface intersecting the radial direction of the cylinder bore at an acute angle, it becomes possible to easily produce the cup seal, and adjust the deformation amount of the base portion with enhanced reliability. Further, the abutment portion may be formed of an annular protrusion which is in line contact with the opening-side-surface. In addition, by providing the abutment surface which is in surface contact with the entire seal groove bottom surface side, it is possible to further stabilize the deformation of the base portion.

Consequently, since the improvement in the sealing property and the stabilization of the ineffective stroke may be achieved, by applying the cylinder apparatus of the present invention to, e.g., a hydraulic pressure master cylinder for a vehicle of a brake system having a brake control mechanism, it is possible to obtain excellent operation feeling and stably obtain reliable brake control.

DETAILED DESCRIPTION OF EXEMPLARY
EMBODIMENTS OF THE PRESENT
INVENTION

FIGS. 1 to 5C show one embodiment in which the cylinder apparatus of the present invention is applied to a hydraulic pressure master cylinder for a vehicle of a plunger type.

Figure 3:
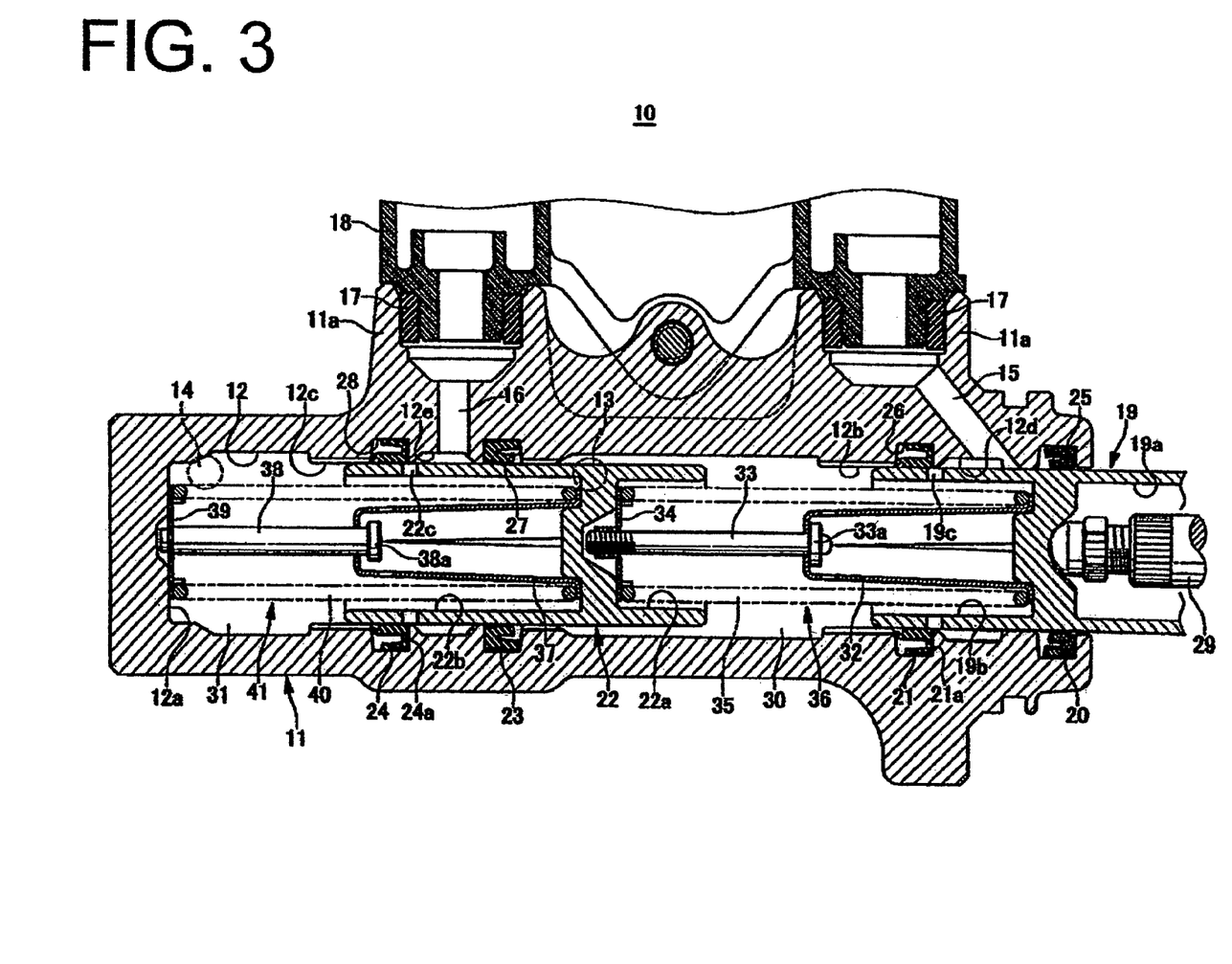
FIG. 3 is a cross-sectional view of a hydraulic pressure master cylinder to which the cylinder apparatus of the present invention is applied.

First, as shown in FIG. 3, in a hydraulic pressure master cylinder 10, a bottomed cylinder bore 12 is formed in a cylinder body 11. The cylinder body 11 is formed with a first output port 13 opened in the middle portion in an axial direction of the cylinder of the cylinder bore 12 and a second output port 14 opened on the bottom portion side of the cylinder bore 12. In addition, a pair of boss portions 11a and 11a is provided to be protruded on the upper portion of the cylinder body 11. First and second fluid passage holes 15 and 16 which communicate with the cylinder bore 12 are respectively provided in both of the boss portions 11a and 11a. A reservoir 18 is attached to the boss portions 11a and 11a via grommet seals 17 and 17.

Into the cylinder bore 12, a first plunger 19 (piston) is slidably inserted via first and second cup seals 20 and 21, and a second plunger 22 (piston) is slidably inserted via third and fourth cup seals 23 and 24. The first cup seal 20 is fitted into a first seal groove 25 foamed on the cylinder bore opening portion side of the first fluid passage hole 15. The second cup seal 21 is fitted into a second seal groove 26 formed on the cylinder bore bottom portion side of the first fluid passage hole 15. The third cup seal 23 is fitted into a third seal groove 27 formed on the cylinder bore opening portion side of the second fluid passage hole 16. The fourth cup seal 24 is fitted into a fourth seal groove 28 formed on the cylinder bore bottom portion side of the second fluid passage hole 16.

The plungers 19 and 22 are respectively formed with first concave portions 19a and 22a on the cylinder bore opening portion side, and are respectively formed with second concave portions 19b and 22b on the cylinder bore bottom portion side. A push rod 29 is inserted into the first concave portion 19a of the first plunger 19. A first hydraulic pressure chamber 30, which communicates with the first output port 13 provided in the middle portion in the axial direction of the cylinder and the first fluid passage hole 15, is defined between the second concave portion 19b of the first plunger 19 and the first concave portion 22a of the second plunger 22. A second hydraulic pressure chamber 31, which communicates with the second output port 14 provided on the cylinder bore bottom portion side and the second fluid passage hole 16, is defined between the second concave portion 22b of the second plunger 22 and a bottom wall 12a of the cylinder bore 12.

In the first plunger 19, one or more small-diameter communication ports 19c extending through the first plunger 19 are drilled in a circumferential direction at positions closer to the cylinder bore opening portion than the position of the second cup seal 21 in a non-operational state. In the second plunger 22 as well, one or more small-diameter communication ports 22c extending through the second plunger 22 are drilled in the circumferential direction at positions closer to the cylinder bore opening portion than the position of the fourth cup seal 24 in the non-operational state.

In the first hydraulic pressure chamber 30, there is disposed a first spring mechanism 36 including: a first retainer 32 having a substantially cylindrical shape; a first guide pin 33 inserted into the first retainer 32 and having a head portion 33a locked at the tip end portion of the first retainer 32 and a base portion attached to a first attachment plate 34; and a first return spring 35 biasing the first plunger 19 toward the cylinder bore opening portion side.

Further, in the second hydraulic pressure chamber 31, similarly to the first spring mechanism 36, there is disposed a second spring mechanism 41 including: a second retainer 37 having the substantially cylindrical shape; a second guide pin 38 inserted into the second retainer 37 and having a head portion 38a locked at the tip end portion of the second retainer 37 and a base portion attached to a second attachment plate 39; and a second return spring 40 biasing the second plunger 22 toward the cylinder bore opening portion side.

In the cylinder bore 12, small-diameter cylinder portions 12b and 12c are respectively formed on the cylinder bore bottom portion side of each of the second and fourth seal grooves 26 and 28. A large-diameter cylinder portion 12d communicating with the first fluid passage hole 15 and the communication port 19c and a large-diameter cylinder portion 12e communicating with the second fluid passage hole 16 and the communication port 22c are respectively formed on the cylinder bore opening portion side of each of the second and fourth seal grooves 26 and 28. The first and third seal grooves 25 and 27 are well-known annular seal grooves, and the first and third cup seals 20 and 23 are well-known cup seals.

Because the present invention is applied to the second cup seal 21 fitted into the second seal groove 26 and the fourth cup seal 24 fitted into the fourth seal groove 28, and the second and fourth cup seals 21 and 24 have the same structure, a description will be given hereinbelow to the second seal groove 26 and the second cup seal 21 with reference to FIGS. 1, 2, 4, and 5, and a detailed description and depiction of the fourth seal groove 28 and the fourth cup seal 24 will be omitted.

Figure 1:
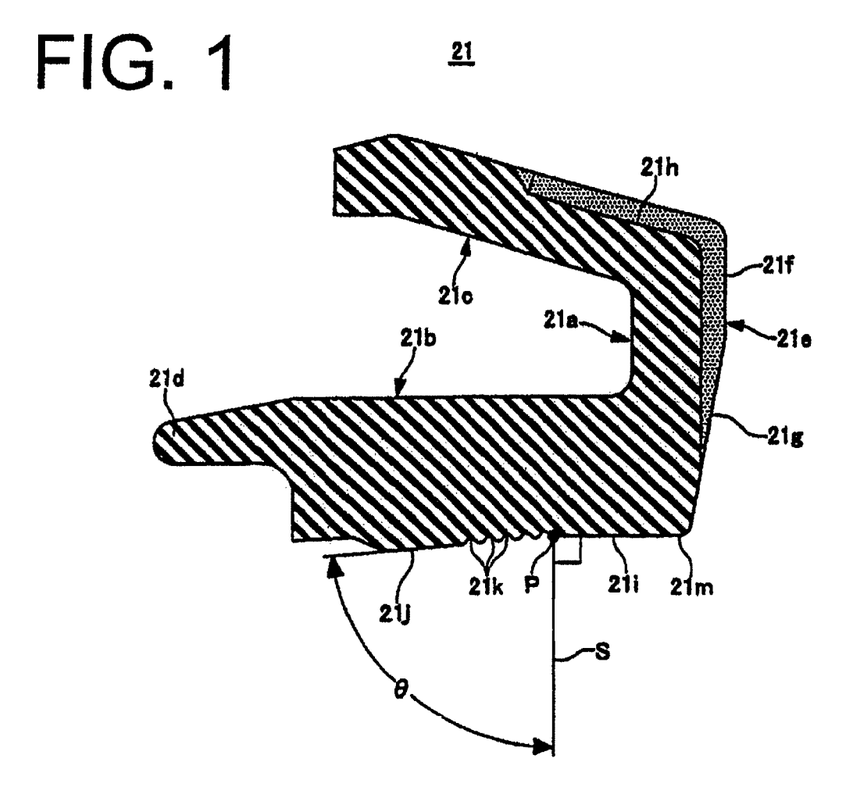
FIG. 1 is a cross-sectional view showing one embodiment of a cup seal used in a cylinder apparatus of the present invention.
Figure 4:
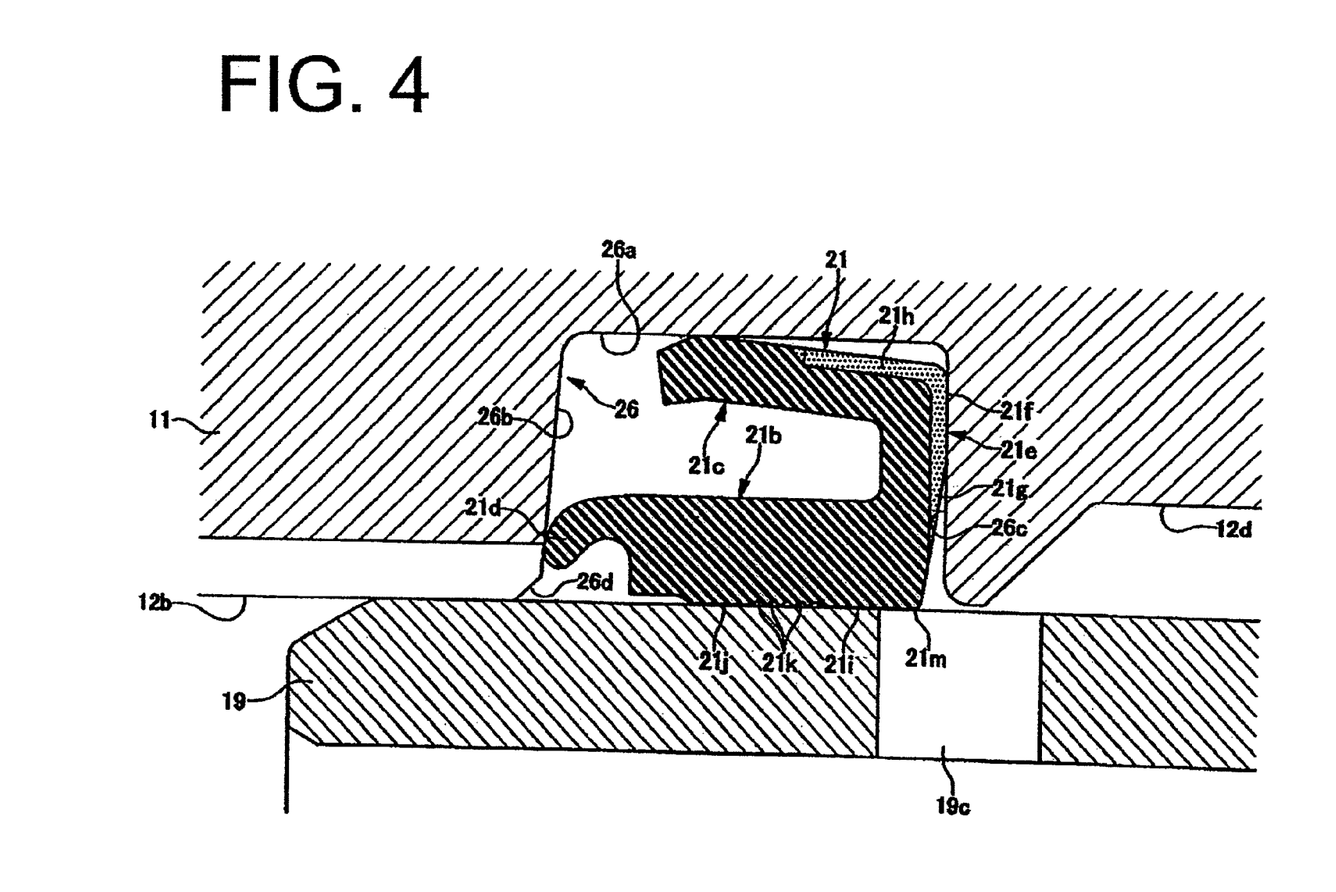
FIG. 4 is an enlarged cross-sectional view of the principal portion of the hydraulic pressure master cylinder.

The second seal groove 26 is an annular groove having a seal groove bottom surface 26a extending in a circumferential direction, a bottom-side-surface 26b which is located on a cylinder bore bottom portion side; a opening-side-surface 26c which is located on a cylinder bore opening portion side; and a seal groove opening 26d opened on the first plunger 19 side. The bottom-side-surface 26b is a conical surface such that an axial length between the bottom-side-surface 26b and the opening-side-surface 26c becomes gradually larger toward the inner circumferential side. Further, an imaginary top of the conical surface of the bottom-side-surface 26b is disposed on the cylinder bore bottom side.

The second cup seal 21 includes: a base portion 21a disposed on the cylinder bore opening portion side of the second seal groove 26; an inner circumferential lip portion 21b; and an outer circumferential lip portion 21c.

The inner circumferential lip portion 21b is extended from the inner circumferential side of the base portion 21a toward the bottom portion of the cylinder bore 12 such that its tip end abuts against the bottom-side-surface 26b to block the seal groove opening 26d. Further, the inner circumferential lip portion 21b has an inner circumferential surface in slidably contact with the outer circumferential surface of the first plunger 19.

The outer circumferential lip portion 21c is extended from the outer circumferential side of the base portion 21a toward the bottom portion of the cylinder bore 12. The outer circumferential lip portion 21c has an outer circumferential surface abutting against the seal groove bottom surface 26a of the second seal groove 26.

Figure 2:
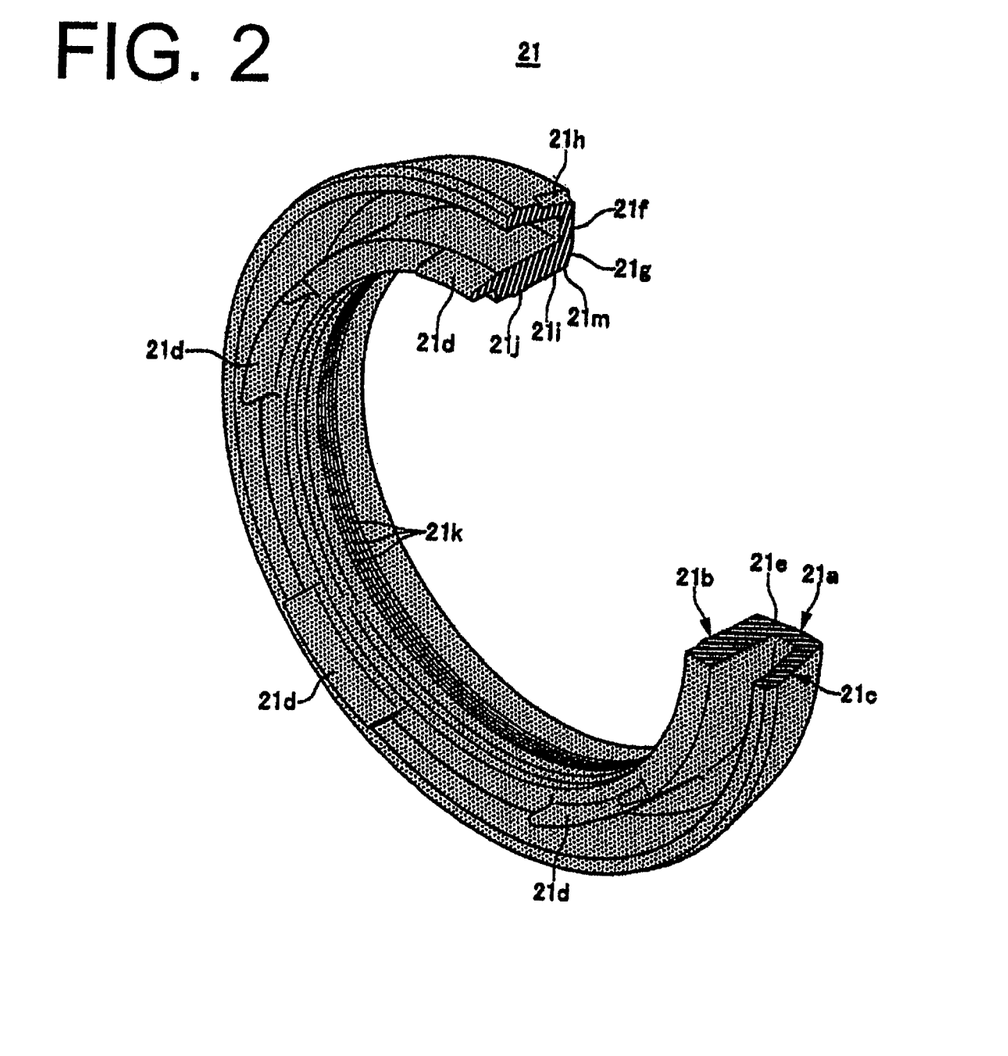
FIG. 2 is a partially cutaway perspective view of the cup seal.

The radial dimension of the inner circumferential lip portion 21b is made to be larger than the radial dimension of the outer circumferential lip portion 21c. A plurality of elastic protruding pieces 21d are provided on the inner circumferential lip portion 21b so as to protrude from the tip on the outer circumferential side of the inner circumferential lip portion 21b toward the cylinder bore bottom portion in the radial direction at regular intervals.

Further, in a base end surface 21e of the base portion 21a opposes to the opening-side-surface 26c of the second seal groove 26, about half of the base end surface 21e on the outer circumferential side in the radial direction is protruded toward the cylinder bore opening portion side. When the second cup seal 21 is fitted into the second seal groove 26, the base end surface 21e serves as an abutment surface 21f which is brought into surface contact with the part on the seal groove bottom surface 26a side which is the outer circumferential side of the opening-side-surface 26c.

On the other hand, about half of the base end surface 21e on the seal groove opening 26d side in the radial direction which is the inner circumferential side of the base end surface 21e serves as a contact pressure adjustment portion 21g (contact pressure adjustment surface) formed of a conical surface. The conical surface of the contact pressure adjustment surface 21g is such that distance between the base end surface 21e and the opening-side-surface 26c becomes gradually large toward the inner circumference from the abutment surface 21f. The conical surface of the contact pressure adjustment surface 21g intersects with an imaginary cylindrical plane of the cylinder bore 12 at an acute angle.

As for the contact pressure adjustment surface 21g, when the hydraulic pressure master cylinder 10 is in the non-operational state, a gap is formed between the half of the opening-side-surface 26c on the inner circumferential side and the half of the base end surface 21e on the inner circumferential side (non-contact state).

On the other hand, when the hydraulic pressure master cylinder 10 is in the operational state, the half of the opening-side-surface 26c on the inner circumferential side and the half of the base end surface 21e on the inner circumferential side contact with each other by deformation of the base portion 21a resulting from a rise in the hydraulic pressure of the first hydraulic pressure chamber 30 (pressure-contact state).

A plurality of communication grooves 21h for causing the inner circumferential side and the outer circumferential side of the base portion 21a to communicate with each other are formed from the abutment surface 21f to the outer circumferential surface of the outer circumferential lip portion 21c on the base portion side. In addition, the length from the abutment surface 21f to the tip end portion of each of the elastic protruding pieces 21d is made to be larger than the length in the axial direction of the second seal groove 26. The tip end portion of each of the elastic protruding pieces 21d abuts against the bottom-side-surface 26b of the second seal groove 26 in a state where the tip end portion of each of the elastic protruding pieces 21d is bent toward the plunger side when the second cup seal 21 is fitted into the second seal groove 26.

In a state where the second cup seal 21 is not fitted into the second seal groove 26, the base portion 21a side of the inner circumferential surface of the second cup seal 21 serves as a cylindrical surface 21i which is in parallel with the inner circumferential surface of the cylinder bore 12 and the outer circumferential surface of the first plunger 19. The inner circumferential surface at a position closer to the tip end than the cylindrical surface 21i (i.e., as shown in FIG. 1, the inner circumferential surface at a position closer to the cylinder bore bottom portion than a point P in the middle portion in the axial direction of the cylinder bore) serves as a conical surface 21j which gradually reduces its diameter toward the cylinder bore bottom portion at an angle of θ relative to a plane S orthogonal to the cylindrical surface 21i.

The conical surface 21j is formed such that the tip end portion of the conical surface 21j abuts against the outer circumferential surface of the first plunger 19 to slightly elastically deform the tip end side of the inner circumferential lip portion 21b toward the outer circumferential direction. Thus, the tip end portion of the conical surface 21j reliably abuts against the outer circumferential surface of the first plunger 19 by a restoring force of the inner circumferential lip portion 21b when the second cup seal 21 is fitted into the second seal groove 26 and the first plunger 19 is inserted into the cylinder bore 12. In addition, a plurality of annular grooves 21k for reducing a sliding resistance to the first plunger 19 are provided in parallel with each other in the circumferential direction on the base portion 21a side of the conical surface 21j.

Further, an abutting force maximum portion 21m is provided at an end portion on the cylinder bore opening portion side of the inner circumferential surface part of the base portion 21a and on the base portion side of the cylindrical surface 21i.

At the abutting force maximum portion 21m, the abutting force against the outer circumferential surface of the first plunger 19 becomes maximum within the inner circumferential surface of the second cup seal 21 by suppressing deformation toward the outer circumferential side using the base portion 21a when the second cup seal 21 is fitted into the second seal groove 26 and the first plunger 19 is inserted into the cylinder bore 12.

When the above described hydraulic pressure master cylinder 10 is in non-operation state, the first and second plungers 19 and 22 are arranged at positions shown in FIG. 3 by the elastic forces of the first and second return springs 35 and 40. Thus, a hydraulic fluid is allowed to flow between the reservoir 18 and the first hydraulic pressure chamber 30 via the first fluid passage hole 15, the large-diameter cylinder portion 12d, and the communication port 19c, and the hydraulic fluid is allowed to flow between the reservoir 18 and the second hydraulic pressure chamber 31 via the second fluid passage hole 16, the large-diameter cylinder portion 12e, and the communication port 22c.

In addition, the distance between the second and fourth seal grooves 26 and 28, and the distance between the communication port 19c of the first plunger 19 and the communication port 22c of the second plunger 22 are set to be equal to each other. Further, the contact pressure adjustment surface 21g is apart from the half of the opening-side-surface 26c on the inner circumferential side.

On the other hand, when the hydraulic pressure master cylinder 10 is in operation state, when the push rod 29 pushes the first plunger 19 toward the cylinder bore bottom portion side, the first plunger 19 moves forward in the cylinder bore 12 toward the bottom portion while compressing the first return spring 35 in the first hydraulic pressure chamber 30 and, at the same time, the second plunger 22 starts to move forward toward the cylinder bore bottom portion.

Figure 5A:
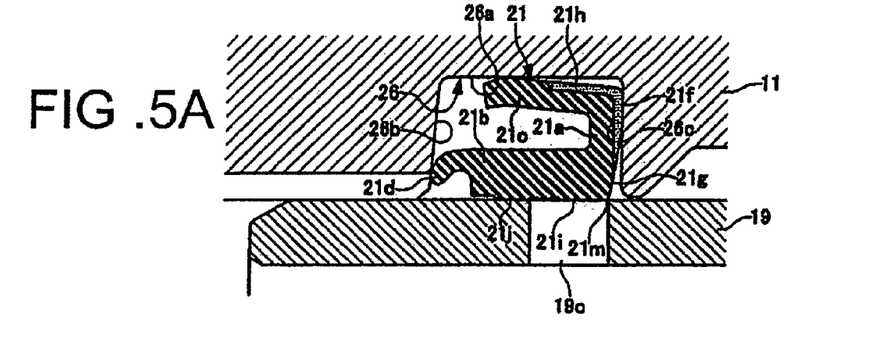
FIGS. 5A to 5C are explanatory views showing states at the time of start of the operation of a piston.
Figure 5B:
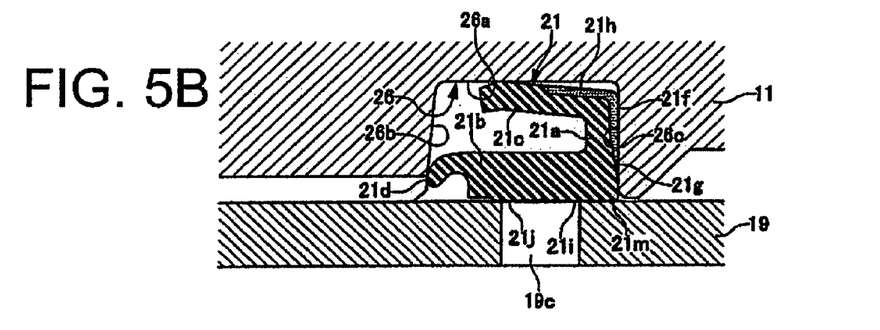
Figure 5C:
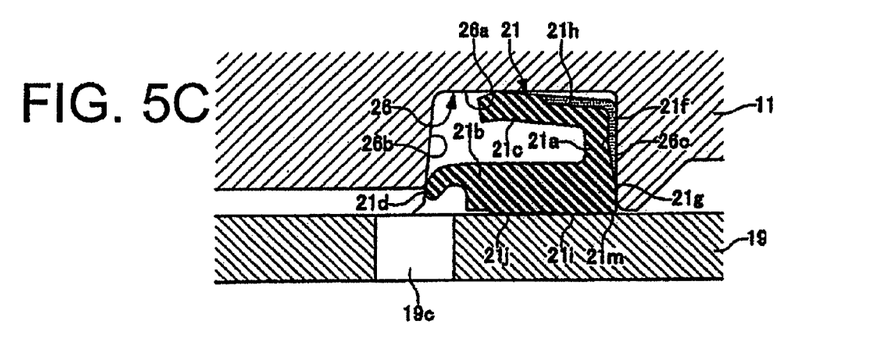

Further, on the first hydraulic pressure chamber 30 side, the first plunger 19 moves forward from the non-operational state, the end portion of the communication port 19c on the cylinder bore opening portion side passes the end portion of the inner circumferential surface of the second cup seal 21 on the cylinder bore opening portion side, and the communication between the first hydraulic pressure chamber 30 and the reservoir 18 is closed. Then, the hydraulic pressure starts to be generated in the first hydraulic pressure chamber 30, and the pressurized hydraulic fluid is supplied to one brake system via the first output port 13 (see FIG. 5 A).

At this time, since the abutting force maximum portion 21m is provided at the end portion of the inner circumferential surface part of the second cup seal 21 on the cylinder bore opening portion side, the abutting force maximum portion 21m reliably abuts against the outer circumferential surface of the first plunger 19 at the point when the end portion of the communication port 19c on the cylinder bore opening portion side passes the abutting force maximum portion 21m so as to reliably block the communication between the first hydraulic pressure chamber 30 and the reservoir 18. As a result, it is possible to reliably generate the hydraulic pressure at this point.

Further, when the hydraulic pressure starts to be generated in the first hydraulic pressure chamber 30, in the second cup seal 21, force is exerted by the generated hydraulic pressure in a direction in which the base portion 21a, the inner circumferential lip portion 21b, and the outer circumferential lip portion 21c of the second cup seal 21 are pushed and opened from the inside. Then, the base portion 21a, the inner circumferential lip portion 21b, and the outer circumferential lip portion 21c are respectively pressed against the opening-side-surface 26c, the outer circumferential surface of the first plunger 19, and the seal groove bottom surface 26a.

Because of this, the abutment surface 21f of the outer circumferential part of the base portion 21a is brought into strong pressure contact with the opening-side-surface 26c, the inner circumferential part of the base portion 21a is deformed so as to fill in the gap between the contact pressure adjustment surface 21g and the opening-side-surface 26c, and the contact pressure adjustment surface 21g is brought into pressure contact with the opening-side-surface 26c. At this time, the inner circumferential part of the base portion 21a is deformed so as to press the inner circumferential surface of the base portion 21a toward the outer circumferential surface of the first plunger 19 (see FIG. 5B).

At the point when the hydraulic pressure starts to be generated in the first hydraulic pressure chamber 30, the contact pressure adjustment surface 21g is not in contact with the opening-side-surface 26c so that the contact pressure is not generated between the surfaces 21g and 26c. Thereafter, the contact pressure adjustment surface 21g is brought into pressure contact with the opening-side-surface 26c by the elastic deformation of the inner circumferential part of the base portion 21a resulting from the rise in the hydraulic pressure in the first hydraulic pressure chamber 30 so that the contact pressure is generated between the surfaces 21g and 26c.

Because the contact pressure between the surfaces 21g and 26c is smaller than the contact pressure between the abutment surface 21f (which is already in abutment with the opening-side-surface 26c even before the hydraulic pressure is generated) and the opening-side-surface 26c, the sliding resistance between the surfaces 21g and 26c, the sliding resistance between the surfaces 21g and 26c, which are brought into pressure contact with each other by the hydraulic pressure, may be reduced. Thus, the above-described deformation in which the inner circumferential part of the base portion 21a extends in the radial direction is not impaired by the sliding resistance between the surfaces 21g and 26c.

Consequently, from the point when the first plunger 19 moves forward to close the communication port 19c and the hydraulic fluid starts to be pressurized, it is possible to smoothly press the abutting force maximum portion 21m provided on the inner circumferential surface of the base portion 21a against the opposing outer circumferential surface of the first plunger 19, to optimize the contact pressure between the second cup seal 21 and the first plunger 19, and to stably obtain the reliable sealing force. Because of this, it is possible to prevent an increase in the ineffective stroke even when the forward moving speed of the first plunger 19 is slow, and obtain excellent operation feeling. In addition, since the conical surface 21j provided on the tip end side of the inner circumferential lip portion 21b is also pressed against the outer circumferential surface of the first plunger 19 with the rise in the hydraulic pressure in the first hydraulic pressure chamber 30 resulting from the forward movement of the first plunger 19. Thus, it is possible to sufficiently secure the sealing property provided by the second cup seal 21 (see FIG. 5C).

In addition, the tip end portions of the elastic protruding pieces 21d formed in the second cup seal 21 abut against the bottom-side-surface 26b of the second seal groove. 26 in the state where the tip end portions of the elastic protruding pieces 21d are bent toward the first plunger 19. Thus, the movement of the second cup seal 21 in the axial direction of the cylinder is regulated so that the increase and variation in the ineffective stroke are prevented.

Further, since the inner circumferential lip portion 21b is fitted into the second seal groove 26 in the state where the elastic protruding pieces 21d are bent toward the first plunger, the inner circumferential lip portion 21b is constantly biased toward the first plunger by the reaction force to the bending so that it is possible to secure the sealing property between the inner circumferential lip portion 21b and the first plunger 19.

Furthermore, since the radial dimension of the inner circumferential lip portion 21b is made to be larger than the radial dimension of the outer circumferential lip portion 21c, and the elastic protruding pieces 21d are protruded from the tip end of the inner circumferential lip portion 21b on the outer circumferential side, it is possible to improve stiffness of the inner circumferential lip portion 21b, secure the stable sealing property, and obtain large space for the elastic protruding pieces 21d to be bent toward the first plunger when compared with the case where the outer circumferential lip portion 21c has the normal thickness substantially equal to that of the inner circumferential lip portion 21b.

Moreover, the bottom-side-surface 26b of the second seal groove 26 is formed into the conical surface shape having the length dimension in the axial direction from the opening-side-surface 26c which becomes gradually larger toward the inner circumferential side. Thus, component force exerted in the inner circumferential direction out of the reaction force to the bending of the elastic protruding pieces 21d is increased. Therefore, it is possible to bias the inner circumferential lip portion 21b toward the first plunger with enhanced reliability.

Further, since the second seal groove 26 is formed into a shape in which the seal groove opening 26d side is widened, it is possible to improve a fitting property of the cup seal 21 into the second seal groove 26, and easily bend the tip end portions of the elastic protruding pieces 21d toward the first plunger.

In addition, when the first plunger 19 is retracted to the initial position, since the elastic protruding pieces 21d are provided at regular intervals and a gap is formed between the adjacent elastic protruding pieces 21d, the hydraulic fluid may satisfactorily flow from the reservoir 18 side into the first hydraulic pressure chamber 30 via the gap and the communication grooves 21h so that the second cup seal 21 is not deformed by force.

Further, since the position of the communication port 19c during the non-operation is disposed at a position closer to the cylinder bore opening portion than the base portion 21a of the second cup seal 21, it is possible to make the flow of the hydraulic fluid passing through the communication port 19c smooth. For an example, when the cylinder apparatus of the present invention is applied to a hydraulic pressure master cylinder for a vehicle of a brake system having a brake control mechanism, the flow of the hydraulic fluid caused by the operation of the brake control mechanism is not hampered.

Further, since an increase in the sliding resistance in the entire cup seal can be suppressed to the minimum when compared with the case where the entire inner circumferential surface of the inner circumferential lip portion 21b is strongly pressed against the first-plunger-side part, excellent operation feeling is obtainable.

The abutting force maximum portion 21m may be formed into an arbitrary shape with an arbitrary structure, and the abutting force maximum portion may be obtained by, e.g., forming appropriate convexes and concaves in the circumferential direction of the inner circumferential lip portion 21b. However, in order to achieve a reduction in the ineffective stroke and an improvement in the fluid flow in the communication port during the non-operation, it is preferable to provide convexes and the concaves on the base portion side in the inner circumferential surface of the cup seal.

Further, it is possible to easily form the abutting force maximum portion 21m by providing the convexes and the concaves on the inner circumferential surface part of the base portion 21a having a large radial dimension, and it is possible to simplify the shapes of the cup seals 21 and 24 by adopting the cylindrical surface 21i in substantially parallel with the inner circumferential surface of the cylinder bore 12 and the outer circumferential surface of the piston (the first plunger 19, the second plunger 22) as the portion provided with the abutting force maximum portion 21m.

Furthermore, the inner circumferential surface of the tip end of the inner circumferential lip portion 21b may be formed into the cylindrical surface similar to the abutting force maximum portion. However, by adopting the conical surface 21j as described above, it is possible to enhance the sealing property when the hydraulic pressure in the hydraulic pressure chamber rises.

Furthermore, the position of a boundary between the abutment surface 21f and the contact pressure adjustment surface 21g is set at a position closer to the outer circumference than an extended base end portion of the inner circumferential lip portion 21b in the radial direction (i.e., a position closer to the outer circumference than a position where the surface on the outer circumferential side of the inner circumferential lip portion 21b is extended and intersected by the base end surface 21e). Therefore, it is possible to sufficiently secure a deformation amount of the base portion 21a and pressing force toward the first plunger 19 when compared with the case where the boundary is located at a position close to the inner circumference of the base portion.

In addition, it is preferable to set the position of the boundary at a position closer to the inner circumference than an extended base end portion of the outer circumferential lip portion 21c (i.e., a position closer to the inner circumference than a position where the surface on the inner circumferential side of the outer circumferential lip portion 21c is extended and intersected by the base end surface 21e). When the boundary is located at a position close to the outer circumference of the base portion, there is a possibility that the deformation amount of the base portion 21a becomes excessively large to impair the stability.

Further, the shape of the contact pressure adjustment surface 21g is not limited to the above-described conical surface, and the contact pressure adjustment surface 21g may also be formed into a spherical shape.

Also on the second hydraulic pressure chamber 31 side, similarly to the first hydraulic pressure chamber 30 side, at the point when the second plunger 22 moves forward from the non-operational state, the end portion of the communication port 22c on the cylinder bore opening portion side passes the base portion 24a of the fourth cup seal 24. Thus, the communication between the second hydraulic pressure chamber 31 and the reservoir 18 is closed by the abutting force maximum portion, the hydraulic pressure starts to be generated in the second hydraulic pressure chamber 31, and the pressurized hydraulic fluid is supplied to the other brake system via the second output port 14.

Figure 6:
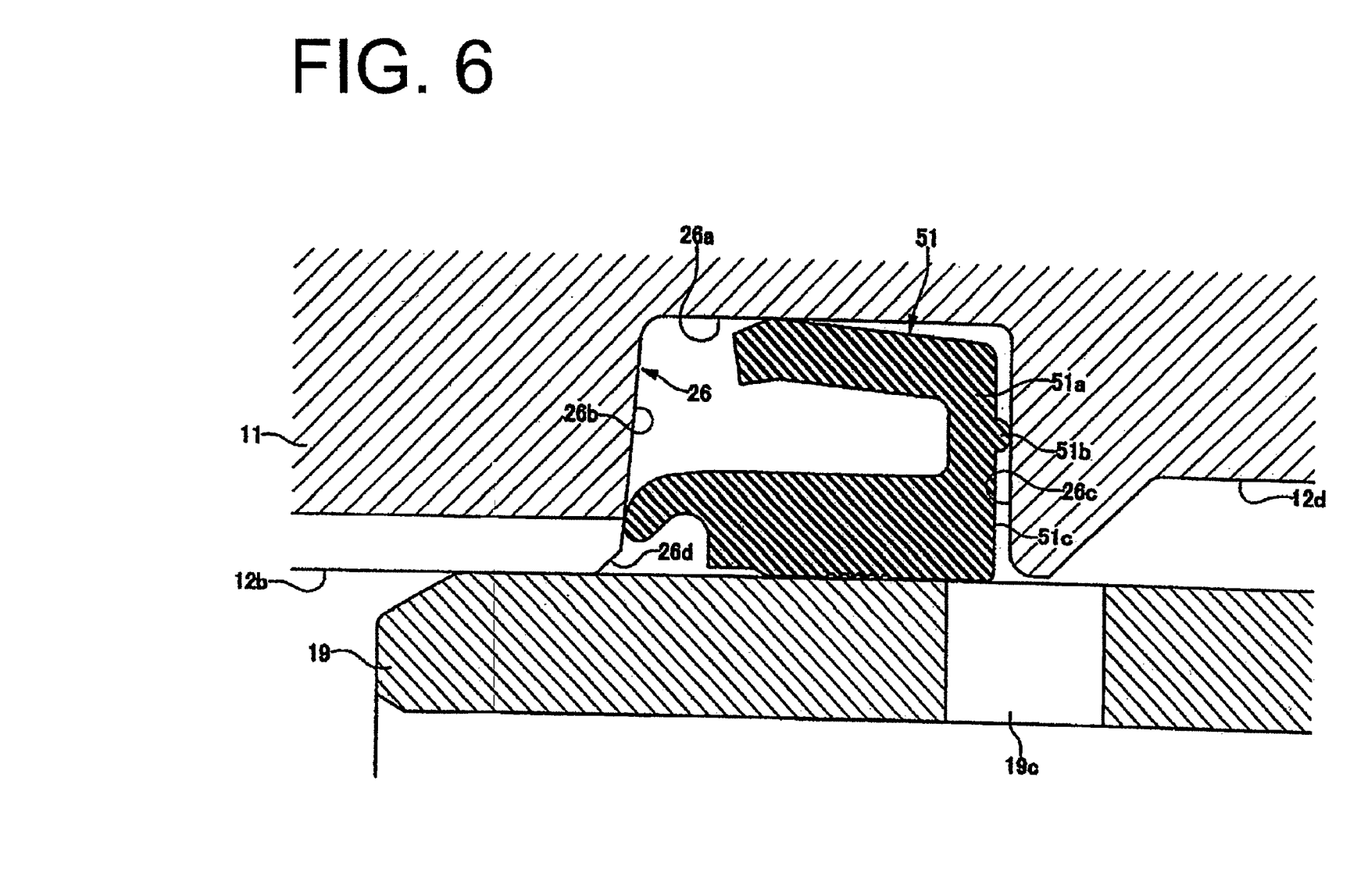
FIG. 6 is a cross-sectional view of a hydraulic pressure master cylinder showing a second embodiment of the present invention.

FIG. 6 is an enlarged cross-sectional view of the principal portion of a hydraulic pressure master cylinder showing another embodiment of the present invention. In the description shown below, the detailed description of the components which are the same as those of the hydraulic pressure master cylinder shown in the above-described embodiment will be omitted by retaining the same reference numerals.

In a cup seal 51 shown in the present embodiment, an annular protrusion 51b is provided at the middle portion in the radial direction of a base end surface 51a opposing the opening-side-surface 26c of the second seal groove 26, and a contact pressure adjustment surface 51c similar to the one described above is provided on the inner circumferential side of the protrusion 51b by causing the tip end of the protrusion 51b to abut against the opening-side-surface 26c so as to be in line contact therewith. Also in the present embodiment, it is possible to obtain the similar operation and effect by appropriately setting the position and the shape of the protrusion 51b.

In the above-described embodiment, a reduction in the ineffective stroke and an improvement in the fluid flow in the communication port during the non-operation are achieved by providing the abutting force maximum portion on the inner circumferential surface of the base portion. However, the abutting force maximum portion may be provided at other parts on the base portion side of the inner circumferential surface of the cup seal, and the entire inner circumferential surface of the cup seal may have a substantially identical abutting force without providing the abutting force maximum portion.

In addition, although the stabilization of the abutting force is achieved by providing the abutting force maximum portion on the cylindrical surface, the abutting force maximum portion may also be provided on a conical surface or a convex and concave surface. Further, although the improvement in the sealing property during the rise in the hydraulic pressure is achieved by forming the inner circumferential surface on the cylinder bore bottom portion side into the conical surface, the inner circumferential surface on the cylinder bore bottom portion side may also be formed into the cylindrical surface or the convex and concave surface.

While the invention has been described in connection with the exemplary embodiments, it will be obvious to those skilled in the art that various changes and modifications may be made therein without departing from the present invention, and it is aimed, therefore, to cover in the appended claim all such changes and modifications as fall within the true spirit and scope of the present invention.

What is claimed is:

1. A cylinder apparatus comprising:
a cylinder body including
a seal groove provided in a cylinder bore,
a cup seal fitted into the seal groove, and
a piston slidably inserted into the cylinder bore, wherein
the cup seal includes
a base portion having a base end surface opposing an opening-side-surface of the seal groove,
an inner circumferential lip portion having an inner circumferential surface slidably abutting against an outer circumferential surface of the piston,
an outer circumferential lip portion having an outer circumferential surface abutting against a bottom surface of the seal groove,
an abutment portion provided on the base end surface of the base portion of the cup seal, and
a contact pressure adjustment portion provided on the base end surface of the base portion, and
the contact pressure adjustment portion does not contact with an inner circumferential side of the opening-side-surface of the seal groove in a state where the cylinder apparatus is in a non-operational state, and contacts with the inner circumferential side of the opening-side-surface in a state where the cylinder apparatus is in an operational state.

2. The cylinder apparatus of claim 1, wherein
the seal groove has a seal groove opening opened to a piston side,
the seal groove opening is closer to an inner circumference than the abutment portion on the base end surface, and
the contact pressure adjustment portion is provided on a seal groove opening side to extend across an entire circumference of the cup seal.

3. The cylinder apparatus of claim 1, wherein
the seal groove includes
the seal groove bottom surface positioned between a bottom-side-surface and the opening-side-surface, and
a seal groove opening opened to a piston side.

4. The cylinder apparatus of claim 3, wherein
the seal groove bottom surface extends in a circumferential direction,
the bottom-side-surface is on a cylinder bore bottom portion side, and
the opening-side-surface is on a cylinder bore opening portion side.

5. The cylinder apparatus of claim 4, wherein the base portion is disposed on the cylinder bore opening portion side of the seal groove.

6. The cylinder apparatus of claim 1, wherein the outer circumferential lip portion extends from an outer circumferential side of the base portion toward a bottom portion of the cylinder bore.

7. The cylinder apparatus of claim 1, wherein the abutment portion is protruded from the base end surface of the base portion of the cup seal toward a cylinder bore opening portion so that a protruded end thereof abuts with the opening-side-surface of the seal groove.

8. The cylinder apparatus of claim 7, wherein the contact pressure adjustment portion is provided on the base end surface of the base portion of the cup seal at a position closer to an inner circumference than the abutment portion.

9. The cylinder apparatus of claim 8, wherein the abutment portion is provided at a position closer to an outer circumference than an extended base end portion of the inner circumferential lip portion.

10. The cylinder apparatus of claim 1, wherein the contact pressure adjustment portion is a surface in which a distance between the surface and the opening-side-surface of the seal groove gradually becomes large toward an inner circumferential side from the abutment portion.

11. The cylinder apparatus of claim 1, wherein the contact pressure adjustment portion is a conical surface which intersects a cylindrical surface of the cylinder bore at an acute angle.

12. The cylinder apparatus of claim 1, wherein the abutment portion has an abutment surface brought into surface contact with an outer circumferential side of the opening-side-surface.

* * * * *